Sept. 5, 1967
R. S. LACY, JR
3,339,367
METHOD AND APPARATUS FOR INSULATED SUBMERGED OIL STORAGE
Filed May 27, 1965
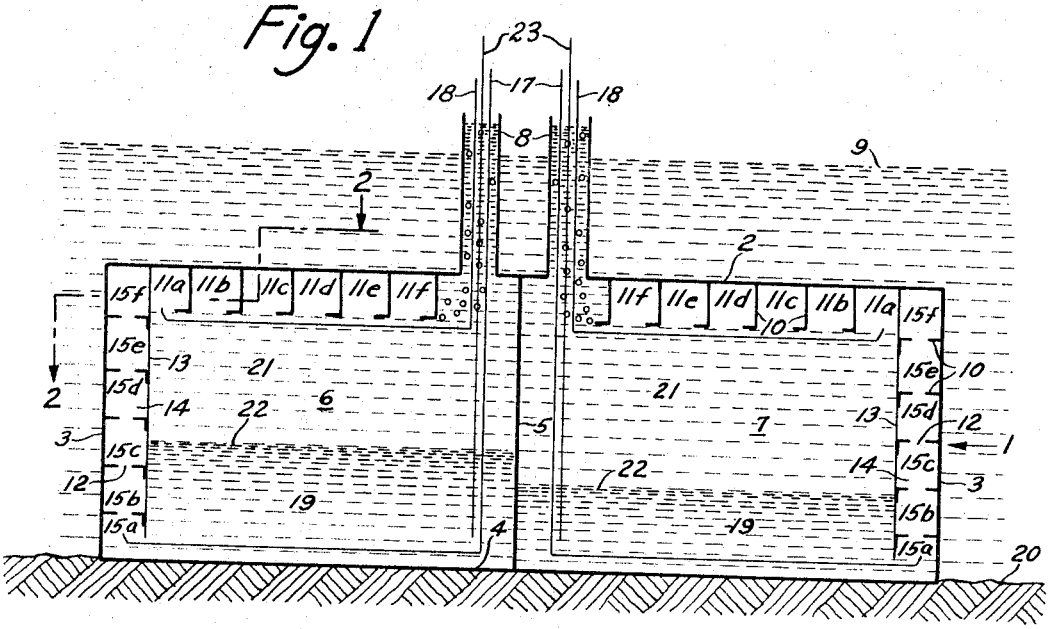
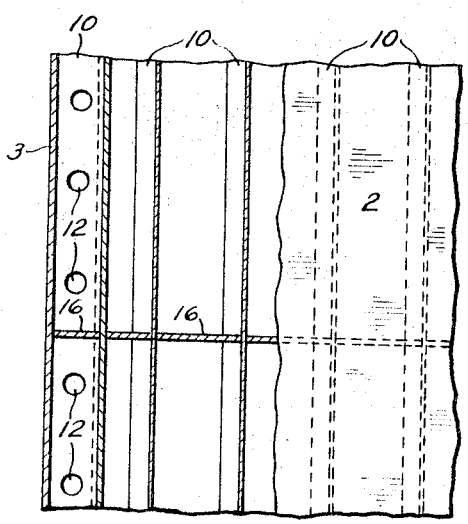
INVENTOR
*Ray S. Lacy Jr.*

3,339,367
Patented Sept. 5, 1967

3,339,367
METHOD AND APPARATUS FOR INSULATED SUBMERGED OIL STORAGE
Ray S. Lacy, Jr., Beaumont, Tex., assignor to Bethlehem Steel Corporation, a corporation of Delaware
Filed May 27, 1965, Ser. No. 459,398
14 Claims. (Cl. 61—63)

ABSTRACT OF THE DISCLOSURE

Submersible oil storage apparatus with structural elements at the sides and top defining chambers from which liquid can be displaced by air. The layer of air thus interposed between the contents of the tank and the surrounding body of water acts as a thermal insulator.

---

This invention relates generally to method and apparatus for storing oil in offshore areas. More specifically, this invention relates to method and apparatus for thermally insulating from the surrounding body of water oil stored in submerged tanks.

Submersible oil storage apparatus is known to those familiar with this art, as shown for example in U.S. Patents 3,145,539 and 3,146,458. Oil stored in such apparatus is thermally exposed to the temperature of the surrounding body of water which, in some areas, can be quite low. Certain oils, specifically those with a high paraffin content, will jell or precipitate solids when subjected to low temperatures and, if these oils are stored in submerged storage tanks in certain marine areas having cold waters, the resulting jelling or precipitation of solids will interfere with the normal operation of the storage tanks. These oils, when taken from a well, are quite warm, and the problem has been to provide adequate thermal insulation between the contents of the storage tank and the surrounding body of water, which thermal insulation can withstand the rigorous conditions under which the storage tank is operated and yet maintain the temperature of the oil while it is in the storage tank above the point at which jelling or precipitation of solid occurs. Ordinary insulating materials are expensive and must be isolated from direct contact with oil or water.

One of the objects of this invention is to provide improved method and apparatus for storing oil in offshore areas.

Another of the objects of this invention is to provide improved method and apparatus for thermally insulating from a surrounding body of water oil in submerged storage tanks.

Other and further objects of this invention will become apparent during the course of the following description and by reference to the accompanying drawings and the appended claims.

Briefly, it has been discovered that the foregoing objects can be attained by displacing the liquid contents of a submerged storage tank away from the walls of the tank by means of a body of gaseous fluid, and maintaining this body of gaseous fluid as a thermal insulator in closed-top open-bottom chambers provided by structural stiffening members between the said liquid contents of the tank and those walls of the tank in thermal contact (i.e., in substantial heat-exchangeable relation) with the outside body of water.

Referring now to the drawings, in which like numerals represent like parts in the several views:

FIGURE 1 represents diagrammatically a vertical section of a hydraulic-displacement operated oil storage tank submerged in a body of water and supported on the marine floor.

FIGURE 2 represents an enlarged horizontal section taken along the line 2—2 of FIGURE 1.

Oil storage tank 1, which is submersible and refloatable, is seen as comprising top plating or wall 2, side plating or wall 3, bottom plating 4, and a vertical bulkhead or wall 5 subdividing the said oil storage tank 1 into compartments 6 and 7. In the preferred embodiment, oil storage tank 1 is of the hydraulic displacement type, and conventionally each of the compartments 6 and 7 will have an oil line 8 communicating with the upper portions thereof. Compartments 6 and 7 may communicate directly with the surrounding body of water 9 through openings in side plating 3 adjacent the bottom portions thereof as is known in the art, which openings are not shown in FIGURE 1. Alternatively, water lines 23 may be provided, as taught by U.S. Patents 3,145,539 and 3,146,458, communicating between the lower portions of compartments 6 and 7 and a water receiver above the surface of the body of water 9. The particular details of the oil and water lines form no part of the present invention other than in providing means for operating the preferred embodiment of storage tank 1 on well-known hydraulic displacement principles.

Top plating 2, side plating 3, bottom plating 4 and vertical bulkhead 5 are conventionally provided with structural stiffening members, typically in the form of angles or channels 10, secured thereto to stiffen the same in a manner well known to the art. Only those members 10 secured to top plating 2 and side plating 3 are shown in FIGURE 1, as it is these members 10 with which the present invention in the preferred embodiment is particularly concerned.

Members 10 are seal welded to top plating 2 to provide a plurality of closed-top open-bottom chambers 11a, 11b, 11c, 11d, 11e, 11f side by side across the inner face of said top plating 2 over compartments 6 and 7. Members 10 are seal welded to side plating 3, and each of these members 10 is provided with spaced perforations 12. Sheathing 13 extending from top plating 2 towards, but short of, bottom plating 4, is secured to the free legs of members 10 to provide a closed-top open-bottom chamber 14 on the inner face of side plating 3, which chamber 14 comprises subchambers 15a, 15b, 15c, 15d, 15e, 15f arranged one above the other.

Chambers 11e–11f and 14 can be subdivided into relatively short horizontal lengths by means of bulkheads or other structural elements 16 extending at right angles to and seal welded to the said members 10, side plating 3 and top plating 2 as required.

Air lines 17 and 18, which may for example extend through oil lines 8, are provided for each compartment 6 and 7. Air lines 17 extend below sheathing 13 into subchambers 15a of chamber 14. Air lines 18 extend into chambers 11a for reasons which will hereinafter appear. Air lines 17 and 18 will of course by provided with suitable means for supporting the same from the internal structure of tank 1.

The operation of the preferred embodiment of oil storage tank 1 will now be described.

Initially, compartments 6 and 7 are empty of any liquid, and tank 1 may be transported to location as by floating in the body of water 9. Then, tank 1 will be ballasted with water 19 and submerged in the body of water 9, preferably to rest on marine floor 20, suitable means known to those familiar with this art being provided to stabilize tank 1 during this operation. Tank 1 may rest on top of marine floor 20 as shown in FIGURE 1, or in a trench therein which is backfilled with riprap, and if desired piles or spuds may also be used to "pin" tank 1 to the marine floor against vertical and/or lateral forces. In short, whatever means may be necessary under the particular circumstances to stably support tank 1 in the body of water 9 are provided.

It will of course be understood that air which may have been trapped in chambers 11a–11f and 14 by the ballasting and sinking operation hereinabove described may have been compressed in said chambers to such a considerable degree, depending upon the depth of the body of water 9, as to be incapable of providing any significant amount of thermal insulation.

Thereafter, compressed air is introduced through air lines 17 and 18 to displace the water from chambers 11a–11f and 14 and to fill the said chambers with air. Compressed air introduced through air lines 17 into subchambers 15a of chambers 14 will bubble up in water 19 into subchambers 15b, 15c, 15d, 15e and 15f, passing from one subchamber to the subchamber thereabove through perforations 12 in members 10 and displacing water 19 in said subchambers downwardly from one subchamber to the subchamber therebelow until all of the water 19 in chambers 14 is displaced from the said chambers 14 below the bottom of sheathing 13. The air-water interface is thus maintained at the level of the bottom of sheathing 13, and any air in excess of the amount required to displace water 19 to this level will escape below the bottom of sheathing 13 and will rise and enter chambers 11 thereabove. Compressed air introduced through air lines 18 into chambers 11a will displace water 19 in said chambers 11a downwardly, assisted by any excess air bubbling up from the entrance/exit of chambers 14, until the air-water interface falls to the level of the bottom of said chambers 11a. The introduction of compressed air is continued through air lines 18, and the air will be forced below members 10 between chambers 11a and 11b and will bubble up into chambers 11b displacing water 19 downwardly therefrom until the air-water interface falls to the level of the bottom of said chambers 11b. This process is continued, and water 19 is sequentially displaced from chambers 11c, 11d, 11e, 11f, and the said chambers are thereby sequentially filled with air. When chambers 11f are filled with air and the air-water interface falls to the bottom of said chambers 11f, excess air will simply bubble up and escape through oil lines 8, signalling the completion of this phase of operation.

With chambers 11a–11f and 14 filled to capacity with air, storage tank 1 may be operated on conventional displacement principles, oil 21 being introduced for storage through oil lines 8 and displacing water 19 from compartments 6 and 7. During this initial charging operation, there may be a slight increase in internal pressure which would further compress the air in chambers 11a–11f and 14. If so, and if it is required to maintain these chambers 11a–11f and 14 completely filled with air for optimum thermal insulation efficiency, more compressed air can be introduced through air lines 17 and 18. Otherwise, during normal storage operations in which oil displaces water and in normal discharge operations in which water displaces oil, such adjustment of air may not be necessary and valves (not shown) in lines 17 and 18 may be closed. It will be seen that the bodies of air in chambers 11a–11f and 14 are maintained while the relative amounts of oil 21 and water 19 in tank 1 are varied from time to time. Thus, the liquid contents of said tank 1 are substantially thermally insulated from the outside body of water.

In many instances, it may be desirable to introduce oil 21 for storage into one compartment 6 and remove oil 21 from storage in another compartment 7. Conceivably, a long term situation could arise wherein compartment 6 is substantially filled with oil 21 and compartment 7 is substantially filled with water 19 which may be taken from the outside body of water 9. If it is anticipated that excessive heat losses could occur through bulkheads separating the compartments, such as bulkhead 5 between compartments 6 and 7, the same principle can be applied to one or both sides of bulkhead 5 as was applied to side plating 3. In other words, bulkhead 5 which will normally be stiffened with members similar to members 10 can be provided with sheathing similar to sheathing 13 so as to establish on either or both sides of the said bulkhead 5 a closed-top open-bottom chamber similar to chambers 14, and air piping can be provided for the introduction of compressed air into said chamber or chambers to displace the liquid therefrom and to maintain said chamber or chambers filled with air.

As the liquid contents of tank 1 will be in direct physical contact with some of the internal metallic structure of tank 1, there will of course be some heat losses occurring through conduction even though all of the chambers 11a–11f and 14 are filled with air. However, the area of conduction is quite small, and these heat losses will be insignificant, particularly when compared to the heat losses which could occur if the said chambers 11a–11f and 14 were not filled with air. Even so, these heat losses can be further reduced, if desired, by inserting heat breaks of suitable material between sheathing 13 and the adjacent members 10, and by mounting heat breaks to the lower legs or flanges of those members 10 secured to top plating 2 in which event the vertical dimension of chambers 11a–11f will be increased by the thickness of the heat break.

Some heat losses may occur through the oil-water interfaces 22 in compartments 6 and 7. However, these heat losses will be relatively insignificant, due in part to the non-turbulent character of the two liquids, the heat-transfer-retarding qualities of any film which might form at the interface 22, the relatively small quantity of water 19 in compartments 6 and 7 when the latter are filled to capacity with oil 21, and the insulating effect of the low-specific-heat marine floor 20.

Although the invention has, in the preferred embodiment, been described as employing air for the insulating fluid in chambers 11a–11f and 14, it will be understood that other gaseous fluids may be used.

In the event that structural requirements dictate the use of members 10 of very large vertical dimension to stiffen top plating 2, and it is not necessary to utilize the full vertical dimension of chambers 11a–11f for thermal insulation purposes as hereinbefore described, apertures may be provided in the vertical legs or webs of members 10 at the appropriate elevation, whereby compressed air would "spill" from one of said chambers to the adjacent chamber through these apertures, rather than below the said members 10, so as to provide a blanket of insulating air of the desired thickness.

While the invention has been described in relation to the preferred embodiment of hydraulic-displacement operated oil storage tanks, it is to be understood that the invention is also capable of use with non-hydraulic-displacement operated oil storage tanks. In this event, the only liquid in the tank would be oil.

The term "oil" as used in the specification and claims is intended to cover all liquids having a specific gravity less than that of the body of water in which the apparatus of this invention is operated.

I claim:
1. Apparatus adapted to store oil below the surface of a body of water, said apparatus comprising:
   (a) a tank having walls, said tank being adapted to be submerged with said walls in thermal contact with the body of water, said tank being further adapted to receive therein oil,
   (b) means within said tank cooperating with said walls to provide a closed-top open-bottom chamber within said tank adjacent the said walls,
   (c) oil conduit means communicating with the interior of said tank,
   (d) means to introduce gaseous fluid into said chamber to substantially thermally insulate the oil in said tank from the said body of water through the said walls.

2. Apparatus adapted to store oil below the surface of a body of water, said apparatus comprising:
 (a) a tank having walls, said tank being adapted to be submerged with said walls in thermal contact with the body of water, said tank being further adapted to receive therein oil,
 (b) means within said tank cooperating with said walls to provide a closed-top open-bottom chamber within said tank adjacent the said walls,
 (c) oil conduit means communicating with the interior of said tank,
 (d) means to introduce gaseous fluid into said chamber to displace oil from said chamber through the bottom of said chamber and to substantially thermally insulate oil in the tank from the said body of water through the said walls.

3. Hydraulic displacement storage apparatus adapted to store oil below the surface of a body of water and to discharge oil from storage, said apparatus comprising:
 (a) a tank having walls, said tank being adapted to be submerged with said walls in thermal contact with the body of water, said tank being further adapted to receive therein liquid contents comprising oil and water,
 (b) means within said tank cooperating with said walls to provide a closed-top open-bottom chamber within said tank adjacent the said walls,
 (c) oil conduit means communicating with the interior of said tank,
 (d) water conduit means communicating with the interior of said tank,
 (e) means to introduce gaseous fluid into said chamber to substantially thermally insulate the liquid contents of said tank from the said body of water through the said walls.

4. Hydraulic displacement storage apparatus adapted to store oil below the surface of a body of water and to discharge oil from storage, said apparatus comprising:
 (a) a tank having walls, said tank being adapted to be submerged with said walls in thermal contact with the body of water, said tank being further adapted to receive therein liquid contents comprising oil and water,
 (b) means within said tank cooperating with said walls to provide a closed-top open-bottom chamber within said tank adjacent the said walls,
 (c) oil conduit means communicating with the interior of said tank,
 (d) water conduit means communicating with the interior of said tank,
 (e) means to introduce gaseous fluid into said chamber to displace liquid from said chamber through the bottom of said chamber and to substantially thermally insulate the liquid contents of said tank from the said body of water through the said walls.

5. Hydraulic displacement storage apparatus adapted to store oil below the surface of a body of water and to discharge oil from storage, said apparatus comprising:
 (a) a tank having walls, said tank being adapted to be submerged with said walls in thermal contact with the body of water, said tank being further adapted to receive therein liquid contents comprising oil and water,
 (b) a plurality of spaced structural members within said tank and secured to said walls, said structural members stiffening said walls and cooperating with said walls to provide a plurality of closed-top open-bottom chambers within said tank adjacent the said walls,
 (c) oil conduit means communicating with the interior of said tank,
 (d) water conduit means communicating with the interior of said tank,
 (e) means to introduce gaseous fluid into said chambers to substantially thermally insulate the liquid contents of said tank from the said body of water through the said walls.

6. Hydraulic displacement storage apparatus adapted to store oil below the surface of a body of water and to discharge oil from storage, said apparatus comprising:
 (a) a tank having vertical walls, said tank being adapted to be submerged with said vertical walls in thermal contact with the body of water, said tank being further adapted to receive therein liquid contents comprising oil and water,
 (b) a plurality of spaced horizontal structural members within said tank,
   each structural member having a first leg and a second leg, said first leg being secured to one of said vertical walls of said tank to stiffen said wall, said second leg being spaced from said wall and depending from said first leg,
 said structural members being arranged one above the other and cooperating with said vertical walls to provide a plurality of chambers within said tank adjacent the said vertical walls, said first legs of said structural members being perforated,
 (c) an inner wall secured to the second legs of said structural members and extending from the upper portion of said tank towards but short of the bottom of said tank,
 (d) oil conduit means communicating with the interior of said tank,
 (e) water conduit means communicating with the interior of said tank,
 (f) means to introduce gaseous fluid into the lowermost chamber, whereby said gaseous fluid will pass through said perforations into the chambers above, to substantially thermally insulate the liquid contents of said tank from the said body of water through the said vertical walls.

7. Hydraulic displacement storage apparatus adapted to store oil below the surface of a body of water and to discharge oil from storage, said apparatus comprising:
 (a) a tank having walls, said tank being adapted to be submerged with said walls in thermal contact with the body of water, said tank being further adapted to receive therein liquid contents comprising oil and water,
 (b) a plurality of spaced structural members within said tank and secured to said walls, said structural members stiffening said walls and cooperating with said walls to provide a plurality of closed-top open-bottom chambers within said tank adjacent the said walls,
 (c) oil conduit means communicating with the interior of said tank,
 (d) water conduit means communicating with the interior of said tank,
 (e) means to introduce gaseous fluid into said chambers to displace liquid from said chambers through the bottom of said chambers and to substantially thermally insulate the liquid contents of said tank from the said body of water through the said walls.

8. Hydraulic displacement storage apparatus adapted to store oil below the surface of a body of water and to discharge oil from storage, said apparatus comprising:
 (a) a tank having vertical walls, said tank being adapted to be submerged with said vertical walls in thermal contact with the body of water, said tank being further adapted to receive therein liquid contents comprising oil and water,
 (b) a plurality of spaced horizontal structural members within said tank,
   each structural member having a first leg and a second leg, said first leg being secured to one of said vertical walls of said tank to stiffen said wall, said second leg being spaced from said wall and depending from said first leg,
 said structural members being arranged one above the other and cooperating with said vertical walls to provide a plurality of chambers within said tank adjacent the said vertical walls, said first legs of said structural members being perforated, (c) an inner wall secured to the second legs of said structural members and extending from the upper portion of said tank towards but short of the bottom of said tank, (d) oil conduit means communicating with the interior of said tank, (e) water conduit means communicating with the interior of said tank, (f) means to introduce gaseous fluid into said chambers to displace liquid from said chambers through the bottom of said chambers and to substantially thermally insulate the liquid contents of said tank from the said body of water through the said walls.

9. Method of storing oil beneath the surface of a body of water and insulating said oil from the said body of water, said method comprising:
(a) submerging an oil storage tank in said body of water,
(b) introducing oil for storage into said tank,
(c) displacing oil away from the walls of said tank by a body of gaseous fluid.

10. Method of storing oil beneath the surface of a body of water and insulating said oil from the said body of water, said method comprising:
(a) submerging an oil storage tank in said body of water,
(b) introducing oil for storage into said tank,
(c) maintaining a body of gaseous fluid between and in contact with said oil and the walls of said tank.

11. Method of storing oil beneath the surface of a body of water and insulating said oil from the said body of water, said method comprising:
(a) ballasting said tank with water to submerge said tank in said body of water,
(b) displacing said ballast water with oil,
(c) establishing a body of gaseous fluid between and in contact with the liquid contents of said tank and the walls of said tank.

12. Method of storing oil beneath the surface of a body of water and insulating said oil from the said body of water, said method comprising:
(a) ballasting said tank with water to submerge said tank in said body of water,
(b) displacing said ballast water away from the walls of said tank by a body of gaseous fluid,
(c) displacing said ballast water with oil while maintaining said body of gaseous fluid between the liquid contents of said tank and the walls of said tank.

13. Apparatus adapted to store oil below the surface of a body of water, said apparatus comprising:
(a) a tank having side walls, a top and a bottom, said tank being adapted to be submerged with said walls and top in contact with the surrounding body of water,
(b) a plurality of stiffening members secured to said side walls and extending into the interior of the tank,
(c) sheathing secured to said stiffening members and to the top of the tank and extending from the top of the tank downwardly to a point closely adjacent the bottom of the tank,
(d) said sheathing forming with the side walls and that portion of the top of the tank between the side walls and said sheathing a closed-top, open-bottom, chamber extending around the periphery of the tank on the interior thereof,
(e) means to introduce oil into, and to discharge oil from, the interior of said tank,
(f) means to introduce a gaseous fluid into said chamber to thermally insulate oil in said tank from the body of water.

14. Apparatus adapted to store oil below the surface of a body of water, said apparatus comprising:
(a) a tank having side walls, a top and a bottom, said tank being adapted to be submerged with said walls and top in contact with the surrounding body of water,
(b) a plurality of first stiffening members secured to said side walls and extending into the interior of the tank,
(c) sheathing secured to said first stiffening members and to the top of the tank and extending from the top of the tank downwardly to a point closely adjacent the bottom of the tank,
(d) said sheathing forming with the side walls and that portion of the top of the tank between the side walls and said sheathing a closed-top, open-bottom, chamber extending around the periphery of the tank on the interior thereof,
(e) a plurality of second stiffening members secured to said top and extending into the interior of the tank,
(f) said second stiffening members forming, with the top of the tank, a plurality of closed-top, open-bottom, chambers extending across substantially the entire top of the tank on the interior thereof,
(g) means to introduce oil into, and to discharge oil from, the interior of said tank,
(h) means to introduce a gaseous fluid into said chambers to thermally insulate the oil in said tank from the body of water.

References Cited

UNITED STATES PATENTS

| | | | |
|---|---|---|---|
| 575,203 | 1/1897 | Van Beek | 9—8.5 |
| 2,491,474 | 12/1949 | Beaumont | 114—.5 |
| 2,748,739 | 6/1956 | Monti et al. | |

DAVID J. WILLIAMOWSKY, *Primary Examiner.*

J. K. BELL, *Assistant Examiner.*